United States Patent [19]

Malleolo

[11] Patent Number: 4,999,818
[45] Date of Patent: Mar. 12, 1991

[54] ULTRASONIC PEST REPELLER

[76] Inventor: Patrick F. Malleolo, 550 Paularino Ave., L108, Costa Mesa, Calif. 92626

[21] Appl. No.: 408,280

[22] Filed: Sep. 18, 1989

[51] Int. Cl.$^5$ .............................................. H04B 1/02
[52] U.S. Cl. .................................................. 367/139
[58] Field of Search ............... 367/139; 340/384 R, 340/384 E; 116/22 A; 43/124; 119/156

[56] References Cited

U.S. PATENT DOCUMENTS 4,284,845  8/1981  Belcher ............................ 367/139
4,338,593  7/1982  Mills ................................. 367/139
4,769,794  9/1988  Beuter et al. .................... 367/139

Primary Examiner—Thomas H. Tarcza
Assistant Examiner—Daniel T. Pihulic
Attorney, Agent, or Firm—G. Donald Weber, Jr.

[57] ABSTRACT

A relatively simple but highly effective circuit for producing ultrasonic signals which are utilized to repel pests and vermin. The frequency of the signals is sufficiently high to be undetected by humans and most domestic animals and pets.

10 Claims, 1 Drawing Sheet

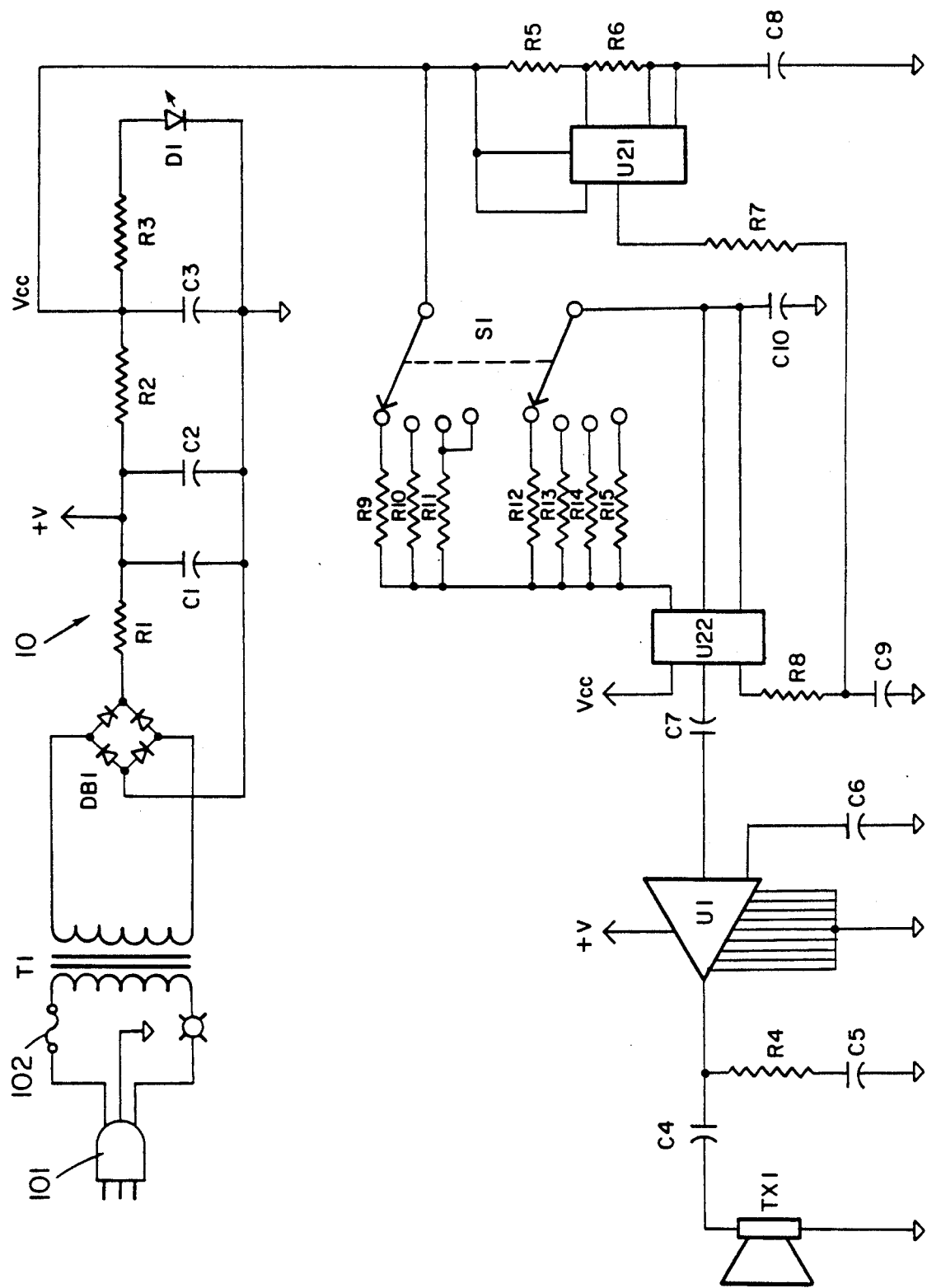

4,999,818

ULTRASONIC PEST REPELLER

BACKGROUND

1. Field of the Invention

This invention is directed to pest repelling devices, in general, and to an electronically controlled, ultrasonic signal generating device, in particular, for repelling pests such as insects, rodents and the like.

2. Prior Art

There are many known types of pests and vermin which annoy, pester and/or adversely affect mankind. Many types of devices, processes, chemicals and the like have been used in the past in order to exterminate and/or repel such pests.

One problem, generally found in extermination, of pests is the use of toxic chemicals or similar components. These materials are, frequently, toxic not only to the undesired pests or vermin but also to mankind, domestic animals, pets and the like. Consequently, these types of products must be used with extreme caution. Moreover, these products are precluded from use in some areas. For example, it is highly undesirable to use these kinds of products around food and the like. Also, use of these materials is undesirable in that the pest can ingest or absorb the material and carry it away. Thus, the pest can expire in an inaccessible location causing the problem associated therewith in terms of attracting other pests or vermin and/or creating an unpleasant odor.

Other mechanical or electrical devices can be used such as applying force to physically eradicate or exterminate the pest. In other cases, the pest can be "zapped" by electronic means. As a result, the devices and related methods have difficulty that the unwanted pest or vermin is still exterminated on the premises which are to be controlled.

A much more desirable approach is to use a "perimeter defense" or the like which keeps the pests and vermin off the protected premises altogether. This has the advantage that no unwanted carcasses are discovered. Perhaps, most importantly, the initial invasion of the premises by the undesired pest or vermin is avoided or inhibited.

PRIOR ART STATEMENT

The most pertinent prior art known to applicant is listed herewith.

U.S. Pat. No. 3,683,113; SYNTHETIC ANIMAL SOUND GENERATOR AND METHOD; J. L. Stewart. This patent is directed to a circuit for generating a narrow bandwidth of audio frequency signals which contain effective parts of animal calls.

U.S. Pat. No. 3,432,618, METHOD AND SYSTEM OF ANALYSING THE INNER EAR: J. L. Stewart. This patent is directed to an electrical impedance network including non-linear elements which similate cochlear non-linearities used by bats or porpoises, for example in echo location.

*The Journal of Wildlife Management;* "Sound as a deterrent to Rats and Mice", by C. M. Sprock et al, Vol. 31, No. 4, Oct. 1967, pp. 729–741.

*The Journal of Stored Product Research;* "Ultrasound as a Deterrent to Rattus Norwegicus", by G. K. Lavoie et al; Vol. 13; 1977; pp. 23-228.

*International Pest Control;* "Attempts to Influence the Feeding Behaviour of Brown Rats Using Ultrasonic Noise Generators", A. P. Meehan; July/August 1976.

U.S. Pat. No. 4,484,315;

SUMMARY OF THE INSTANT INVENTION

The present invention is directed to an electronic circuit for generating ultrasonic signals which are of the appropriate pitch and frequency to disturb and, therefore, repel most pests and vermin without adversely affecting humans or domesticated animals.

The repeller uses or includes a power supply for producing rectified and regulated voltage levels, a timer or oscillator circuit which can be controlled to produce numerous ranges of frequency for selective operation. The frequency signal is supplied to an amplifer and, hence, to a transducer which is used to produce the ultrasonic signal in the ambient.

BRIEF DESCRIPTION OF THE DRAWING

The sole FIGURE is a schematic diagram of the circuit of the instant invention.

DESCRIPTION OF THE PREFERRED EMBODIMENT

The system of the instant invention includes a power supply 100 of substantially conventional design. For example, plug 101 is adapted to plug into any conventional receptacle to receive 110 volts AC. The conductor line from the plug 101 includes a ground connector and a typical pair of conductors which are connected to the primary winding of transformer T1. A fuse 102 is included in the line.

The secondary winding of transformer T1 is connected to opposite nodes of a typical diode bridge DB1 which includes a plurality of diodes or similar rectifiers connected in a rectifier bridge network. The output filtering and smoothing circuits include resistors R1, R2 and R3 associated with capacitors C1, C2 and C3 operate to produce a voltage +V on the order of 18 volts as well as voltage Vcc on the order of 12 volts. These voltages are supplied to the various portions of the circuit, as well. The light emitting diode D1 is included in the circuit to operate as a pilot light to indicate when the circuit is turned on.

The voltage Vcc is connected to the integrated circuit devices which form portions of the circuit, as shown. The voltage +V is applied to the audio amplifier U1.

A suitable transducer TX1 is provided. In particular, the transducer TX1 can take the form of an acoustic speaker such as is well known in the art. This speaker should have operating capability over a range of 22 Khz to 50 KHz. This range is typical, but is not limitative. Moreover, a high fidelity speaker is not essential. One end of the driver coil of transducer TX1 is connected to the ground. The other end of the transducer coil is connected through coupling capacitor C4 to the output of amplifier U1.

The output audio amplifer U1 is also connected to an oscillation suppression circuit comprising resistor R4 and capacitor C5. The amplifier U1 also has a number of external circuit terminals connected to ground in this application.

Typically, the amplifier U1 can be a National Semiconductor LM384 amplifier (or equivalent) which is a power audio amplifier specifically intended for consumer application. The amplifier includes inverting and non-inverting inputs. In this embodiment, the inverting input is connected to the ground via the bypass capacitor C6.

The non-inverting input terminal of U1 is connected to receive signals from an external amplifer terminal EXT (not shown) or from the sweep circuit described hereinafter via coupling capacitor C7.

The sweep circuit includes a dual timing circuit comprising circuits U21 and U22. A typical application uses a National Semiconductor dual timer LM556 (or equivalent) which is a highly stable controller capable of producing time delays or oscillation. In essence, a simple unit can include the two timers which operate independently of each other sharing only the Vcc and the ground connections.

In operation, the first the timing circuit U21 is, in essence, controlled by the RC circuit comprising resistors R5 and R6 along with capacitor C8. As capacitor C8 charges toward Vcc, it applies a control signal to the threshold input terminal, as well the trigger input of circuit U21.

As a function of the values of resistors R5 and R6, as well as capacitor C8, a time constant is achieved and the timing circuit U21 produces appropriate output signals. The output signal from circuit U21 is supplied via resistor R7 to the control input of timing circuit U22. The control input signals are supplied to the circuit U22 via the RC circuit comprising resistor R8 and capacitor C9. Thus, the control signal supplied to timing circuit U22 is a function of the level of the output signal from timing circuit U21. This control signal selectively adjusts the operation of timing circuit U22 and the output signals produced thereby.

In addition, the switching network comprising resistors R9 through R15, in conjunction with capacitor C10 operates to control the oscillation frequency of circuit U22.

Thus, the signal at capacitor C1 triggers the operation of timing circuit U22 and the control signal at capacitor C9 controls the output of circuit U22.

In this instance, resistors R9, R10, and R11 are functionally equivalent to resistor R5, while resistors R12 through R15 are functionally equivalent to resistor R6. The common junction of the resistors R9 through R15, inclusive, is connected to the timing circuit U22. Switch S1 is a dual-pole switch which connects the respective resistors between the voltage source Vcc and the discharge terminal of timing circuit U22 as well as the threshold and trigger terminals of circuit U22.

Thus, by selectively positioning switch S1, an appropriate set of resistors are connected in series between the source Vcc and capacitor C10. In addition, the resistors are connected to the circuit U22 thereby selecting the specific range of frequency of operation of circuit U22. The output of circuit U22 is coupled by coupling capacitor C7 to an input of the audio amplifer U1 which supplies the signals to the transducer TX1 as described supra.

Thus, in operation, the power supply 10 is plugged into the appropriate power source and provides the appropriate voltage levels to the remainder of the circuit. The timing circuit U21 operates as an oscillator based upon the time constant defined by resistors R5 and R6 with capacitor C8. A control signal is then supplied to circuit U22 from circuit U21. Circuit U22 also operates as an oscillator with the appropriate time constant built-in as a result of the resistor network controlled by switch S1. By adjusting switch S1, the frequency range of operation of circuit U22 is controlled. This signal is then supplied to the amplifer U1 which drives the transducer TX1 (speaker) to produce the ultrasonic (i.e. sound waves of more than 20 Khz) output signal waves. Thus, by adjustment of switch S1, the frequency of the output signal is controlled and the types of pest or vermin which are being repelled is selected.

In other words, circuits U21 and U22 are free-running oscillators which operate to trigger themselves and to free-run as a multivibrator when the capacitor C8 or C10 charges through the respective resistor. The resistors R5 and R6 produce a substantially fixed first sweep rate. The switch S1 is used to select the frequency range which is to be swept through by the oscillator circuit U22 as controlled by the signals from circuit U21. The output signals from circuit U22 are amplified by the audio amplifer U1 to approximately 27 watts peak-to-peak. The output of the amplifier U1 is controlled by the oscillation supression circuit comprising resistor R4 and capacitor C5 so that feedback signals are not generated in the transducer TX1.

The ultrasonic waves produced by transducer TX1 are emitted at high volume and can cause rodents and other vermin to avoid the protected area. Because the ultrasonic waves are highly directional, they will reflect off hard surfaces and, thus, tend to fill an entire room with the irritating and annoying sound pressure. This will deter rodents and pests from inhabiting the protected area. The effect can be enhanced by placing the transducers (or a plurality thereof) aimed at the problem area. Moreover, the ultrasonic signals may be used to drive the rodents and/or pests towards traps or baits which are placed in a location selected for safety or convenience.

Thus, there is shown and described a preferred embodiment of the instant invention. This circuit includes specified components for the amplifier and the oscillators. However, any other suitable component can be substituted for those named. It is evident that those skilled in the art may concieve modification or variations to the invention as described herein. Any such modifications and/or variations which fall within the purview of this description are intended to be included therein as well. Thus, the description is not intended to be limitative of the invention but is merely illustrative. The scope of the invention is limited only by the claims appended hereto.

We claim:
1. An ultrasonic pest repeller comprising,
   transducer means for producing ultrasonic pressure waves,
   audio amplifier means connected to drive said transducer means,
   oscillator means connected to drive said audio amplifier means,
   said oscillator means includes at least first and second multivibrator means,
   said oscillator means including a variable resistance network for adjusting the frequency of said oscillator means,
   said variable resistance network is connected to only one of said first and second multivibrator means, and
   coupling means connected from an output of said first multivibrator means to an input of said second multivibrator means.
2. The repeller recited in claim 1 including, power supply means connected to supply power to both of said first and second multivibrator means.

3. The repeller recited in claim 1 wherein, each of said first and second multivibrator means includes an RC time constant circuit for providing a self-triggering signal.

4. The repeller recited in claim 1 including, oscillation suppression means connected between said audio amplifier means and said transducer means.

5. The repeller recited in claim 1 wherein,
said variable resistance network includes a plurality of fixed resistance devices, and
switch means for selectively connecting said fixed resistance devices to one of said first and second multivibrator means.

6. The repeller recited in claim 5 wherein,
all of said fixed resistance devices are connected to a common junction and to one of said first and second multivibrator means.

7. The repeller recited in claim 5 wherein,
said switch means is a dual-pole switch.

8. The repeller recited in claim 1 wherein,
said transducer means comprises an acoustic speaker means.

9. The repeller recited in claim 8 wherein,
said acoustic speaker means has an operating range of 22 KHz to 50 KHz.

10. The repeller recited in claim 1 including,
high frequency coupling means connecting said audio amplifier means to said transducer means.

* * * * *